United States Patent Office 3,445,239
Patented May 20, 1969

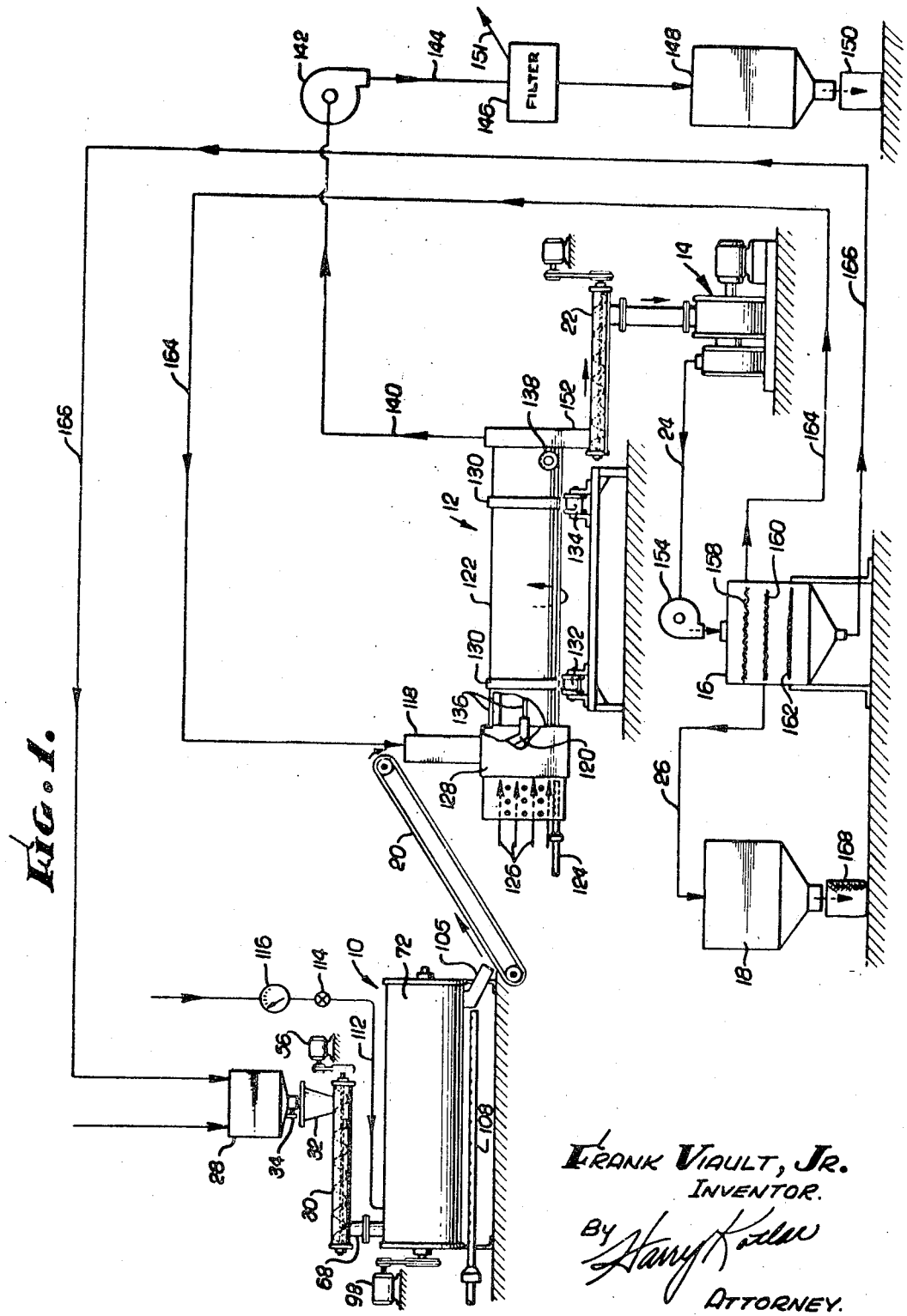

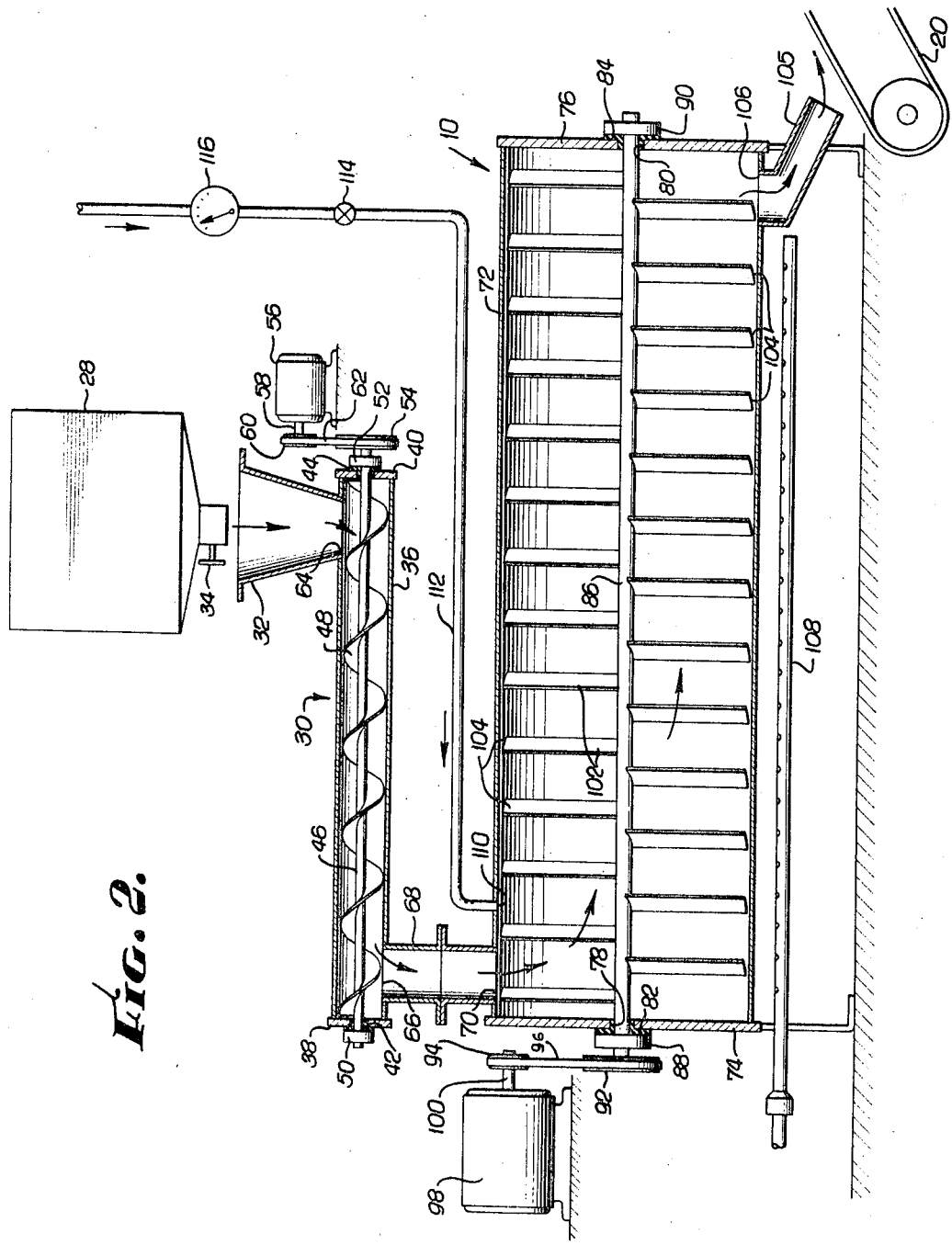

3,445,239
PROCESS FOR PRODUCING BAKED FLOURS
Frank Viault, Jr., Los Angeles, Calif. (270 Portofino Way, Apt. 206, Redondo Beach, Calif. 90277)
Filed Feb. 24, 1965, Ser. No. 434,841
Int. Cl. A21d 2/40
U.S. Cl. 99—93          9 Claims

ABSTRACT OF THE DISCLOSURE

Production of baked flours by moistening flour with water to form dough particles, heating to obtain partial gelatinization, tumbling in the presence of hot air to dry and bake the resulting particles, grinding, sifting and combining the resulting larger gelatinized particles with additional moist dough particles and repeating the drying and sifting steps and collecting the desired sized baked flour.

---

This invention relates to a process of treating various grain flours and more particularly to the preparation of baked flours from such grain flours.

With the advent of commercially, mass-produced foods such as soups, sauces, gravies, pies, meat preparations, and roux for restaurant and home consumption, it has become economically feasible to mass-produce ingredients for such foods. A major ingredient comprises a thickening or breading agent, such as baked flours, which has been found to possess excellent thickening and breading characteristics. These characteristics depend mainly upon the use to which the agent will be put which use, in turn, relies upon a customer's specifications concerning degree of gelatinization, odor, taste, texture, color, etc. Such baked flours have excellent qualities with respect to the above characteristics, in particular, to the degree of gelatinization, which relates to the cooking or baking process of a grain flour. They have, for example, a low gluten content which greatly influences gelatinization. Other flours, such as bread crumbs, have high gluten contents which, if used as thickening agents, would impart a molasses-like constituency to the food in which they are used. The gelatinization characteristics of baked flours, on the other hand, are such that, if properly controlled, the thickened product will not be too soupy or too thick. Furthermore, the coloring of baked flours must be regulated in order to impart an appetizing appearance thereto.

One particular form of a coarsely ground baked flour is known as cracker meal. Depending upon customer specification, this meal may be further ground into a cracker meal flour. In conventional processes for preparing cracker meal, the control of the gelatinization characteristic is very difficult since prior production of such meal had not been attuned to high yields. Consequently, the conventional process for making cracker meal comprises the grinding of broken or over-baked crackers or other rejects from the production of ordinary crackers. At times, cracker meal is also produced from crackers specifically baked for conversion into meal. In the conventional process, a dough is prepared in a mixer from flour and water. It is then shaped into a continuous sheet by a shaping machine and baked in a special oven as the product flows along on a conveyor belt. All the crackers or only rejects, separated from the properly produced crackers, are crushed into meal which is finally sized and sifted. The meal may be further ground into variously granulated flours. The mixer comprises a pivotable box-like machine having a lid. A mixing device is disposed therewithin. A flour and water mixture is placed in the box and is thoroughly mixed. Thereafter, the box pivots 180°, the lid opens and the dough rolls out into the shaping machine. At this point the dough is contiguous and damp, being of a moisture content of at least 40% water and of a room temperature of approximately 70° F.

The shaping machine is a relatively complicated device in which the dough is molded in a continuous sheet by passing it through one or more pairs of rollers which must be spaced properly in order to effect a proper shape and distribution of the sheet. In addition, the rollers must be dusted with flour to prevent adhesion of dough thereto and the dough must be sufficiently damp to obtain a proper sheet shape. In other conventional shapers many shapes, including spaghetti-like strands, are extruded; however, all the shapes are continuous. The oven comprises an endless belt from 100 feet to 200 feet long, which passes through a hot air chamber. The dough is baked into crackers having a preferred light brown coloring. If the baking is too extreme, the crackers burn and these overbaked crackers are set aside to be ground into meal, along with broken crackers. Furthermore, when a large amount of cracker meal is required, perfectly formed crackers must be included with the rejects for the grinding. The cost of conventional equipment is very high which, when added to the cost of preparing and grinding crackers, produces a highly priced product.

Beyond this very high cost, conventional equipment is unsuited for the sole preparation of such an ingredient as cracker meal since it is produced in a very disadvantageous manner. Meal and baked flours must be free from black specks because such a color is unappetizing, having a likeness of grit and a texture to match, although the specks affect the taste of the flours to a lesser degree. These black specks are produced from too much baking which is directly related to the control of the product in the oven. Since the oven is 100 feet to 200 feet long, this control becomes extremely difficult during the process and it is only possible to correct defects after a large amount of cracker has been produced. Furthermore, the conventional process is circuitous since it requires that a cracker first be produced and then crumbled. Because of the circuitous method, the cost of preparing meal is high and, when a large volume of such a baked product is produced, the cost per pound of product increases sufficiently to narrow the profit margin to a minimum. Another disadvantage of the conventional process relates to the moisture content of the meal. Cracker meal, for example, must have a moisture content less than that of the original crackers; consequently, it is necessary to dry the crushed crackers in order to conform to specifications and this additional drying creates a further cost.

It is, therefore, an object of my invention to provide a simple process.

Another object of my invention is the provision of an economical process.

A further object of my invention is to provide a process adaptable to a control which insures a high quality product.

Another object of my invention is to provide a process producing a high yield and very low waste of product.

Another object of my invention is to provide for the preparation of any degree of granulation of baked flours without the need of grinding cracker meal.

Still another object of my invention is to decrease the time required to produce flours.

Yet another object of my invention is the provision of a process adaptable to quick starts and stops.

Another object of my invention is to provide a process adaptable to control large and small quantities of a particular flour with a minimum of time loss due to changeovers.

Another object of my invention is to provide an efficacious manner of changing specifications of the end product rapidly and in a simple manner to produce any one of several baked flours.

Other aims and objects of my invention will become apparent from the following description thereof.

Baked grain flours are essentially prepared from two raw materials, grain flour and water. Generally, a wheat flour, produced under conventional processes from wheat grain, is employed since the majority of users of cracker meal and baked flours specify this grain. However, it is also possible to prepare baked flours from such grains as corn, rye, oats, rice, barley and millet.

The finished baked flour product is dependent to a large extent upon the degree of gelatinization or cooking of the grain flour. The phenomenon of gelatinization is rather complex and is determined, in part, upon time, heat and/or moisture. For example, if a grain flour were mixed with water in certain percentages and heat were applied at a specified temperature, the length of time that the heat was applied would impart certain gelatinization characteristics to the furnished product. If the heat and/or water (moisture) content were varied and the time lessened, a different gelatinization characteristics might result. Furthermore, by applying the heat at different stages and through different mediums, the characteristics might again be changed. These varying gelatinization characteristics might also depend on the basic grain flour so that, as a result, only the specifications demanded by an ultimate user of the baked flour could determine how such parameters as heat, time, and moisture content would be manipulated.

The invention process makes allowance for such variance of the parameters. Basically, a grain flour is combined with a small amount of water in a mixer to form dough particles. The particles are then heat dried in a dryer, ground and sized, if desired, and packed. If the specifications so require, heat may be applied to the particles while being formed in the mixer by application of heat from an external source thereto and/or by heating the water combined with the grain flour in order to gelatinize partially the dough particles. In such a case, the partially gelatinized particles are further and completely baked in the dryer. In order to effectuate efficient drying and baking so as to complete the gelatinization phenomenon, the particles are tumbled within the dryer as hot air passes therethrough. The baked particles are then processed to the finished product.

A further refinement in the process depends upon the respective sizes or granulation of the dough particles and of the baked product. For example, if a relatively large amount of water were added to the grain flour, the dough particles would be correspondingly large, although in the inventive process not so much water is added as to form a contiguous mass. Then, when the particles are baked, the inside of the particles would be gelatinized to a lesser extent than the outside. This example would produce a relatively coarse finished product. On the other hand, if a relatively smaller amount of water were added to the grain flour in the mixer, the dough particles would be correspondingly small so that the baking in the dryer would more thoroughly create evenly gelatinized insides and outsides of the particles. Any heat applied to the particles while in the mixer might again affect the gelatinization characteristic.

Since all these factors determine the various characteristics of the baked flour product, such as color, texture, moisture content, granulation, odor and taste as well as gelatinization, the inventive process has been designated to afford control over the characteristics. In detail, the grain flour is fed into the mixer with a specified amount of water at a specified temperature for thorough combination into a mixture of dough particles. A pressure control gauge secured in an inlet water line controls the amount of awter added and, therefore, the moisture content in the dough mixture. Generally, the moisture or water content is limited to less than 40 percent which is the approximate point at which the dough is formed either as particles or as a contiguous mass. In the inventive process for producing a baked grain flour, it is necessary that the dough be formed as particles; consequently, the moisture content must be less than 40 percent. If it is desired that the end product be of small fine particles, the moisture content is held relatively low so that the mixture emanating from the mixer is of small dough particles. On the other hand, if the end product is to comprise relatively large particles, then the dough mixture consists of relalatively large particles having a moisture content of a higher percentage of water. In addition, both the water may be heated and heat from an external source may be applied directly to the mixer to impart important consequences with respect to the various characteristics on the formation of the finished product. The purpose of the heat is to encourage gelatinization, i.e., cooking, in the mixer so that the cooking is begun in the mixer and completed in the dryer. Consequently, the drying and cooking time and temperature in the dryer may be less than that if there were not heat applied during the mixing stage. This two step cooking procedure contributes to control of the manufacturing process and of the end baked product. If desired, however, the temperature may be quite low in the mixer so that a minimum of gelatinization occurs therein. Whether there is or is not any heat applied will depend on the specifications designed for the end product. Heat may be thus controlled by the temperatures in the mixer and in the dryer.

The dough particles are then carried from the mixer and fed into one end of the dryer which comprises a rotating drum provided with ridges attached to the inner surface thereof. Air, heated by a direct gas burner, passes axially through the drum in the direction of the feeding of the dough mixture. The drum is tilted downwardly at a slight angle so that, as the rotating ridges tumble the dough, the force of gravity helps to move the product along to the end opposite from that into which the dough is inserted. The primary dough particles moving force, however, is the hot air because of the large number of small dough particles. The dough particles are inserted into the drum axially at the higher end and are removed from the lowest part of the drum at the lower end. The hot air enters at the same end of the drum as the dough particles and exists by means of a forced draft system at the uppermost part of the other end of the drum. Because some of the dough mixture comprises very fine particles, they become dust and are cooked or baked to a greater extent than desired. These overbaked dust particles exit with the air by virtue of the forced air system and are filtered out into a separate container. The temperature within the dryer ranges from 260° F. to 300° F. and is critical in order to control the degree of gelatinization, the color, the moisture content and the other characteristics of the end product.

The specifications of the end product also determine the original size of the dough particles when inserted into the dryer, the rate of passage of the product through the dryer, and the temperature within the dryer. A high rate of passage and a high temperature are preferred to produce a quality product. As stated above, a dough mixture coming from the mixer and having a low moisture content will produce a finely particled dough whose end product will be of low moisture content. The moisture content may be less than a desired precentage. To create a higher moisture content in the end product, the dough in the mixer may be provided with a higher moisture content so that, as the dough particles pass through the dryer, the baked product will be of larger particles whose outside will be baked and insides will be slightly moist, i.e., not as throughly baked. During a grinding operation following the baking, these larger particles are broken down into smaller particles and the entire mass is mixed in order to distribute evenly the moisture and to provide a uniform product of baked grain flour.

In grinding operation, the baked product is routed from the dryer to a grinding machine by material handling means such as a screw conveyor, forced air, and gravity. A screw conveyor is effective since it lends itself to the handling of dry products. It is closed to prevent accidents and to prevent the loss of baked particles. The baked particles are ground rather than crushed by a hammer mill, such as an "Orbit" or other conventional grinder, to prevent any flaking of the particles.

The baked particles are finally conveyed by a forced air system from the grinder to a sifter and sizer which comprises a series of screens through which the ground product particles pass. The larger particles or "overs" are directed to one container. The smallest particles or "throughs" are directed to another container. A third container collects the desired sized product particles. There are cases in which it may not be desired to separate and size the particles; therefore, less than three or no screens are employed. The sifting and sizing machine is vibrated or agitated by conventional motor means. The small dry "throughs" are generally returned to the mixer while the large coarse "overs," which are relatively wet inside, are returned directly to the dryer. The dust emanating from the dryer and collected by the filter is generally too baked to be re-useable, although such dust comprises a very small fraction of the total end product.

Reference is now made to the following description and accompany drawings wherein an illustrative and exemplary apparatus for carrying out the inventive process is disclosed and in which:

FIG. 1 is a partially diagrammatic and cut-away view of the process equipment and FIG. 2 is a view in cross-section of the mixer.

The apparatus comprises a high speed mixer 10, a rotary dryer 12, a grinder 14, a sifter 16, and a packer 18. The materials are moved between the machines by material handling means including an endless belt 20 disposed between the mixer and the dryer, a screw conveyor 22 positioned between the dryer and the grinder, a duct 24 connected between the grinder and the sifter, and a conduit 26 placed between the sifter and the packer.

A grain flour is stored within a feeder 28 and is disposed to be fed into a screw conveyor 30 by means of a trough 32. The feeder is provided with a trap or gate disposed at the bottom thereof, which trap is controlled by a handle 34. Thus, when it is desired to begin the operation, the handle is manipulated to allow grain flour to drop into the trough from the feeder.

Referring to FIG. 2, conveyor 30 comprises an elongated cylinder 36 enclosed at its ends by plates 38 and 40 having bearing seals 42 and 44 disposed therein. A shaft 46 is journaled within the cylinder along the axis thereof by the seals. A continuous screw 48 is secured to the shaft and is in close contact with the walls of the cylinder. The shaft is prevented from axial movement by means of blocks 50 and 52 which are secured to the shaft adjacent the plates. The shaft extends beyond plate 40 and a pulley 54 is secured to the shaft extension. A motor 56 is provided with a driving shaft 58 and a pulley 60 attached thereto. A belt 62 joins the pulleys for rotation of endless screw 48. Trough 32 is secured to cylinder 36 and communicates therewithin through opening 64 at one end of the conveyor. An opening 66 is disposed at the opposite end and communicates with the mixer through a tube 68 at opening 70.

Mixer 10 includes a cylindrical body 72 which is closed at both ends by plates 74 and 76. The plates are provided with openings 78 and 80 in which bearing seals 82 and 84 are disposed. A shaft 86 extends through openings 78 and 80. Holders 88 and 90 are connected to the shaft adjacent plates 74 and 76 to prevent axial movement of the shaft within the mixer. A pulley 92 is secured at one end of the shaft and is driven by a motor pulley 94 by means of a belt 96 drivingly connected therebetween. A motor 98 is secured to pulley 94 by means of a driving shaft 100. A series of blades 102 is affixed to that shaft in a staggered manner. In order to effect thorough mixing, the blades are provided with a pitch disposed 20° to a plane passing normally through the axis of the shaft. The blades are provided with ends 104 which are curved to conform with the inner surface of body 72 in order to provide as small a space therebetween. An exit opening 106 is disposed at the end of the body opposite to opening 70. A burner element 108 is positioned below the mixer.

A water inlet 110 is formed in the body adjacent tube 68. Water is supplied at the inlet through piping 112 which is provided with a valve 114 and a pressure gauge 116 for control of the amount of water supplied.

A grain flour is contained within feeder 28 and is supplied to conveyor 30 through trough 32 by means of gate or trap handle 34. The flour is metered into the mixer by a controlled and continuous rotation of endless screw 48. At the same time, water is metered through piping 112 in accordance with the setting of valve 114 and gauge 116. If desired, the water may be heated to a specified temperature if it is desired that the flour be partially gelatinized in the mixer. Shaft 86 and blades 102 are caused to rotate at a high speed which, in combination with the acute angle of the blades, thoroughly mixes the water and the flour into particles of dough. As discussed above, it is important that the dough be mixed into particles whose size and moisture content are controlled through a combination control of the amount of water and flour respectively supplied to the mixer. This operation is controlled respectively by the valve and the gauge and by the speed of rotation of the endless screw. The amount of gelatinization is controlled by the temperature of the water and by the heat supplied to the mixer by means of burner 108.

The arrangement of blades 102 in mixer 10 is designed in such a way that plate 76, holders 88 and 90, and pulley 92 may be disengaged from their respective members so that shaft 86 may be removed from body 72 in order to easily clean the mixer. Screw conveyor 22 is arranged in a similar manner for the same purpose.

The dough particles are ejected from the mixer through spout 105 and are dropped onto belt 20 for conveyance to dryer 12. The dryer includes an entry 118 for reception of the dough particles and tube 120 which conducts the particles into a rotary drum 122. A burner 124 is disposed at one end of the dryer and is positioned to heat air, whose flow is indicated by arrows 126, as the air is drawn through the drum. An entrance-way 128 is disposed between the drum and burner 124 to protect the dough particles from direct contact with the burner flame. A pair of annular collars 130 are secured to the exterior of the drum and are supported on journals 132 and 134 for rotary support thereof. Journal 134 is disposed slightly lower than journal 132 so that a slight tilt is imparted to the dryer. This tilt aids passage of the particles through the drum by means of the force of gravity. In addition, a series of ridges 136 are secured to the inner surface of the drum and extend lengthwise thereto. Consequently, when the drum is rotated, the dough particles are tumbled to afford more efficient drying and baking thereof. A temperature gauge 138 is disposed at one end of the drum to indicate the temperature therein for control of the baking or gelatinization process. A duct 140 is disposed at the lower end of the drum and is connected to a centrifugal blower 142. Because of the draft created by the blower, air is sucked into and through the drum as indicated by arrows 126. As the particles are dried by the hot air, some of the smaller particles burn and become dust which is drawn out through duct 140. The exciting air and baked particles are carried from duct 140 through a duct 144 to a filter 146. The filter catches the baked dust and forwards it to a packer 148 for collection in a container 150.

The cleaned air exits from the filter as shown by arrow 151. The dryer is further provided with an exit portion 152 for discharge of the baked particles.

The particles are carried by conveyor 22 to grinder 14, which may be in the form of a hammer mill or an "Orbit" grinder. The particles are then ground and delivered to sifter 16 by duct 24 by means of a blower 154. If, however, the particles are of a size wherein no grinding is required, the grinder may be dispensed with and the particles are conveyed directly from the conveyor to the sifter.

Sifter 16 comprises, in one embodiment, three series of screens 158, 160 and 162. As illustrated, screen 158 is provided with a large mesh which is disposed to catch and sort out the oversized baked particles. Screen 160 is provided with a medium mesh to collect baked particles which are of the desired size. Screen 162 comprises a small mesh which collects undersized particles. The oversized particles, or "overs," are generally underbaked because of their size and which have, in general, interiors which are too moist. Consequently, the "overs" are conveyed back to the dryer through conduit 164 for further drying and baking. The undersized partices, or "through," are generally baked to a degree which is higher than required; however, these particles are not burned and are re-useable. The "throughs," therefore, are returned to the feeder through conduit 166 for combination with fresh grain flour and water. Screen 160 is provided with a mesh which is designed to select the properly sized baked particles. These particles are removed to baked grain flour packer 18 by conduit 26 and are deposited in a container 168 for packaging and shipment.

Sifter 16 is actuated by a conventional vibration or other means to permit the particles to be sifted through the screens. If the end product does not require a particularly sized particle, or if certain variations in size are required, one or more screens may be eliminated to achieve this purpose.

Specific examples of the process are now set forth. These examples are based upon two end products which are fine and coarse. The approximate size of the baked particles correspond to that part of the process directly preceding the grinding operation. The temperatures of the dough mixtures in the two examples is lower than the temperature of the water being supplied to the mixer because the flour is cool when the water is added and because there is a certain amount of conductivity of heat from the mixer.

Example 1

This example relates to the production of a finely baked flour. One thousand parts of flour are mixed with 306 parts of water at a temperature of 190° F. The dough particles taken from the mixer have a temperature of approximately 97.5° F. and a moisture content of an average 30.6%.

The temperature in the dryer tumbler is 300° F. The percentage of gelatinization of the baked dough particles coming from the heat tumbler is approximately 96%. The amounts of each size, based upon a total of 1,000 parts, are as follows, the sizes given below being a sieve mesh:

| | Parts |
|---|---|
| US No. 5 | 20 |
| US No. 7 | 22 |
| US No. 10 | 124 |
| US No. 20 | 579 |
| US No. 30 | 152 |
| US No. 40 | 50 |
| PAN | 53 |

The moisture of the flour is 5.3% and its color is a light buff.

Example 2

This example relates to a very coarse baked flour. One thousand parts of flour are placed in the mixer with approximately 349 parts of water at a temperature of 190° F. The dough particles coming from the mixer are in lumps larger than those of Example 1. The approximate temperature of the dough particles is 115° F.

The particles were dried and baked in the dryer tumbler at a temperature of 300° F. The percentage of gelatinization is approximately 97.5%. The approximate amount within each of the above sizes, based upon 1,000 parts of baked flour, according to sieve size, is:

| | Parts |
|---|---|
| US No. 5 | 300 |
| US No. 7 | 185 |
| US No. 10 | 130 |
| US No. 20 | 243 |
| US No. 30 | 64 |
| US No. 40 | 28 |
| PAN | 50 |

The moisture of the end coarse product approximates 5.27% and its color is a light buff leaning toward a white.

In the above examples, the end product came out of the dryer tumbler according to specification. Thus, it is obvious that the process is provided with many novel and useful aspects with reference to both the economy of the process and to the quality of the baked product.

Although the invention has been described with reference to a particular process, it will be understood that various changes and modifications may be made therein without departing from the spirit of the invention or the scope of the appended claims.

I claim:

1. A process of preparing baked flours having a desired moisture content and a desired size from grain flour comprising the steps of forming moist dough particles having a moisture content of less than 40% and a temperature of approximately 100° F. by rapidly mixing the grain flour with hot water and applying heat thereto to partially gelatinize said moist particles, drying said partially gelatinized particles by applying hot air thereto at a temperature of between 260° F. and 300° F. while tumbling said partially gelatinized particles for a period of time sufficient to bake and further gelatinize said partially gelatinized particles to produced baked particles, grinding said baked particles, as baked and gelatinized, sifting and sorting said baked particles into the desired size and into sizes larger and smaller than the desired size, mixing the larger of said sizes of baked particles with further moist and partially gelatinized dough particles and subjecting said larger sizes again and said further moist and partially gelatinized dough particles to said drying, said grinding, said sifting, and said sorting steps, mixing the smaller of said sizes with further moist grain flour and further water and subjecting said smaller sizes again and said further moist grain flour to said forming, said drying, said grinding, said sifting, and said sorting steps, and collecting the desired size of baked particles in the form of the baked flours.

2. A process for preparing baked flour from grain flour comprising the steps of mixing the grain flour with water sufficient to form moist particles of dough having a first moisture content, the amount of water used in said mixing step not being so great as to form a contiguous mass of dough, and drying said moist particles by applying heat thereto at a temperature of between 260° F. and 300° F. while agitating said dough particles for a period of time sufficient to gelatinize said moist particles and to impart a second moisture content to said gelatinized particles, sifting and sorting said gelatinized particles into a desired size and into sizes larger and smaller than the desired size, mixing the larger of said sizes of gelatinized particles with further moist dough particles and subjecting said larger sizes again and said further moist dough particles to said drying, said sifting, and said sorting steps, mixing the smaller of said sizes with further grain flour and further water and subjecting said smaller sizes again and said further grain flour and said further water to said mixing, said drying, said sifting, and said sorting steps, and collecting the desired size of gelatinized particles in the form of baked flour.

3. A process for preparing baked flour from grain flour comprising the steps of mixing the grain flour with water sufficient to form moist particles of dough having a first moisture content, the amount of water used in said mixing step not being so great as to form a contiguous mass of dough, drying said moist particles by applying heat thereto at a temperature of between 260° F. and 300° F. while agitating said dough particles for a period of time sufficient to gelatinize said moist particles and to impart a second moisture content to said gelatinized particles, sifting and sorting said gelatinized particles into a desired size and into a size larger than the desired size, mixing the larger size of gelatinized particles with further moist dough particles and subjecting said larger size again with said further moist dough particles to said drying, said sifting, and said sorting steps, and collecting the desired size of gelatinized particles in the form of baked flour.

4. A process as in claim 3 wherein the grain flour is selected from the group consisting of corn, wheat, rye, oats, rice, barley, and millet.

5. A process as in claim 3 including the steps of heating the water during said mixing step and applying heat to the grain flour for partial gelatinization of said moist particles.

6. A process as in claim 5 wherein the heat is of a temperature of 70° F. to 212° F.

7. A process for preparing baked flour from grain flour comprising the steps of mixing the grain flour with water sufficient to form moist particles of dough having a first moisture content, the amount of water used in said mixing step not being so great as to form a contiguous mass of dough, drying said moist particles by applying heat thereto at a temperature of between 260° F. and 300° F. while agitating said dough particles for a period of time sufficient to gelatinize said moist particles and to impart a second moisture content to said gelatinized particles, sifting and sorting said gelatinized particles into a desired size and into a size smaller than the desired size, mixing the smaller size with further grain flour and further water and subjecting said smaller size again with said further grain flour and said further water to said mixing, said drying, said sifting, and said sorting steps, and collecting the desired size of gelatinized particles in the form of baked flour.

8. A process as in claim 7 wherein said agitating step comprises the step of tumbling said moist particles during said drying step.

9. A process as in claim 7 wherein said drying step and said application of heat is effected by the passage of hot air over said moist particles.

References Cited

UNITED STATES PATENTS

| | | | |
|---|---|---|---|
| 1,035,830 | 8/1912 | Anderson | 99—93 |
| 2,956,519 | 10/1960 | Angell | 107—4 |
| 3,212,904 | 10/1965 | Gould et al. | 99—93 |

RAYMOND N. JONES, *Primary Examiner.*

U.S. Cl. X. R.

259—110